(12) United States Patent
Dedieu et al.

(10) Patent No.: US 7,778,411 B2
(45) Date of Patent: Aug. 17, 2010

(54) UNIVERSAL MICROPHONE ARRAY STAND

(75) Inventors: Stephane Dedieu, Ottawa (CA); Philippe Moquin, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1392 days.

(21) Appl. No.: 11/077,069

(22) Filed: Mar. 10, 2005

(65) Prior Publication Data

US 2005/0201551 A1    Sep. 15, 2005

(30) Foreign Application Priority Data

Mar. 15, 2004    (GB)    ................ 0405790.7

(51) Int. Cl.
*H04M 9/00*    (2006.01)
*H04M 1/00*    (2006.01)
(52) U.S. Cl. .................. 379/454; 379/428.02
(58) Field of Classification Search ........... 379/454, 379/420.01, 420.02, 420.03, 420.04
See application file for complete search history.

(56) References Cited

U.S. PATENT DOCUMENTS

| 4,375,584 | A | * | 3/1983 | Muzumdar et al. ...... 379/428.04 |
| 4,773,090 | A | * | 9/1988 | Goatman .................... 379/429 |
| 4,868,875 | A | * | 9/1989 | Goatman .................... 379/429 |
| 4,885,773 | A | * | 12/1989 | Stottlemyer et al. ..... 379/420.03 |
| 4,937,877 | A | * | 6/1990 | Pocock et al. ............... 381/360 |
| 5,121,426 | A | * | 6/1992 | Baumhauer et al. ..... 379/420.03 |
| 5,226,076 | A | * | 7/1993 | Baumhauer et al. ..... 379/420.02 |
| 6,038,311 | A | * | 3/2000 | Nitobe et al. ............ 379/428.03 |
| 6,747,584 | B2 | * | 6/2004 | Havelock .................... 341/143 |
| 6,782,099 | B1 |   | 8/2004 | Fischl |
| 7,269,263 | B2 | * | 9/2007 | Dedieu et al. ................. 381/92 |
| 2003/0125075 | A1 |   | 7/2003 | Klovborg |
| 2003/0165236 | A1 |   | 9/2003 | Fischl |
| 2005/0195988 | A1 | * | 9/2005 | Tashev et al. ................. 381/92 |
| 2007/0110257 | A1 | * | 5/2007 | Dedieu et al. ................. 381/91 |

FOREIGN PATENT DOCUMENTS

| EP | 1 326 410 A1 | 7/2003 |
| EP | 1 538 867 A1 | 6/2005 |
| FR | 2844416 A1 | 3/2004 |
| WO | WO 01/29979 A1 | 4/2001 |
| WO | WO 03/079650 | 9/2003 |

OTHER PUBLICATIONS

Office Action from Canadian Intellectual Property Office; Oct. 30, 2007.

* cited by examiner

*Primary Examiner*—Fan Tsang
*Assistant Examiner*—Phylesha Dabney

(57) ABSTRACT

A universal stand is provided integrating a microphone array for use with a variety of telephone sets. The stand includes an enclosure having a surface for supporting a telephone set, and a cable for transmitting signals detected by the microphone array to the telephone set.

11 Claims, 5 Drawing Sheets

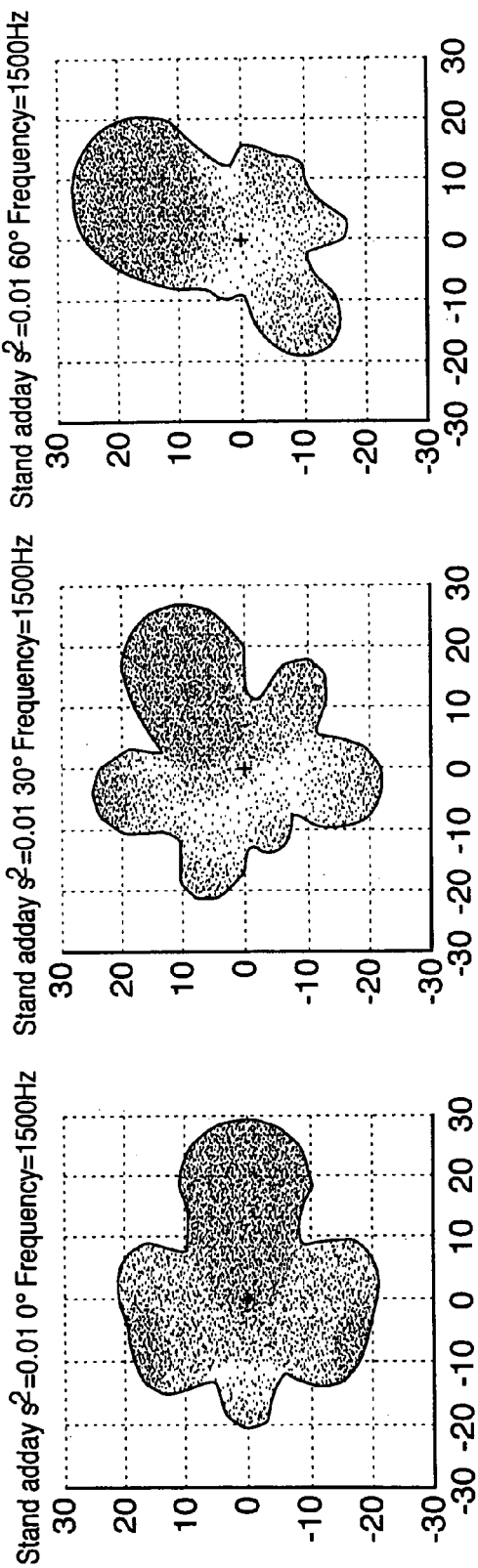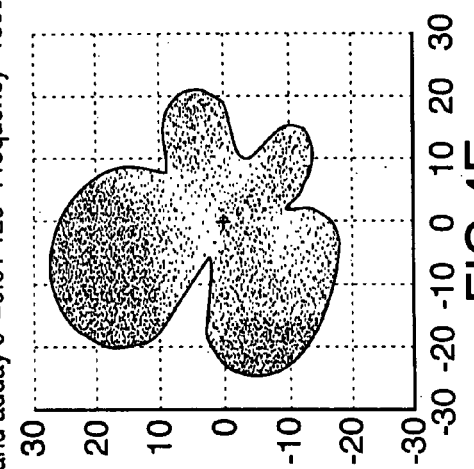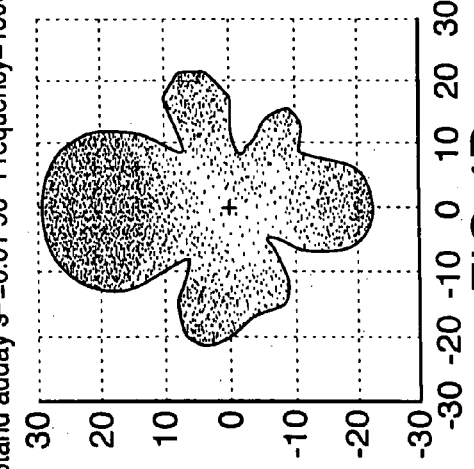

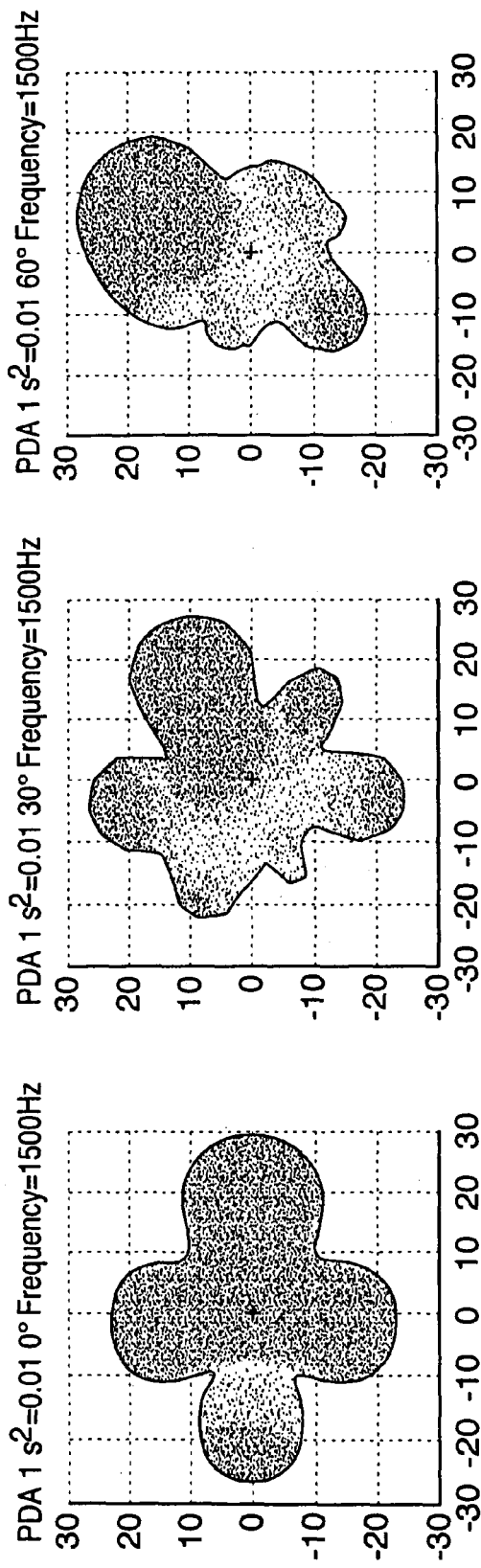
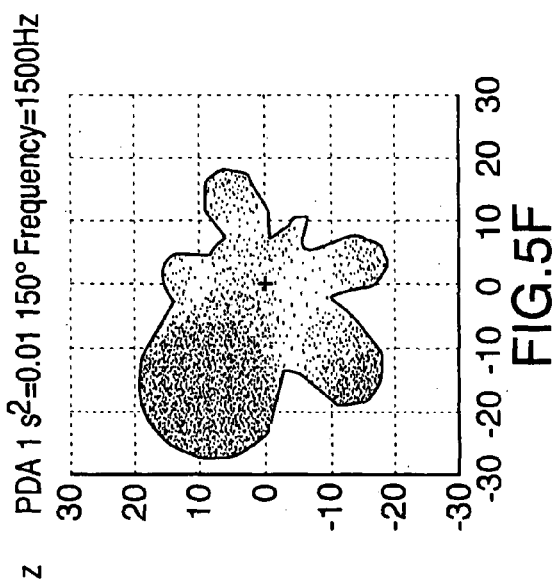
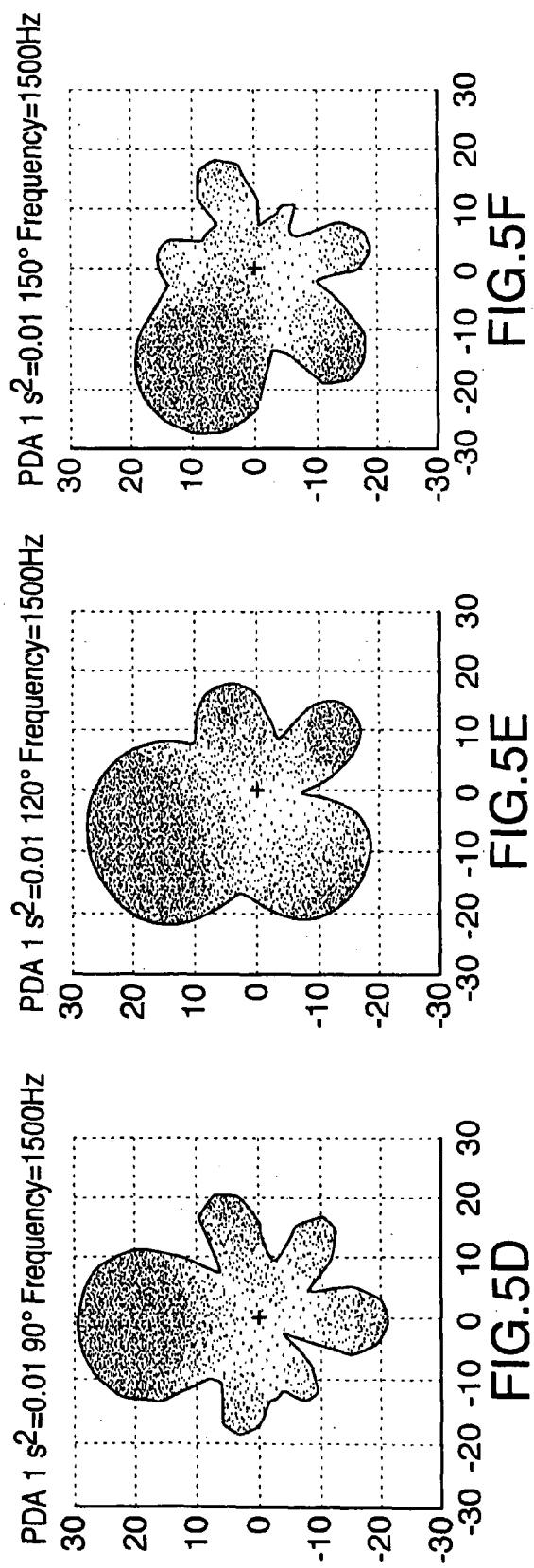

UNIVERSAL MICROPHONE ARRAY STAND

FIELD OF THE INVENTION

The present invention relates in general to telephones, and more particularly to a telephone stand incorporating an array of microphones, wherein the stand is adapted to be used with a large variety of telephone sets including telephone sets from different vendors.

BACKGROUND OF THE INVENTION

Directional microphones are commonly used to pick up sound in speakerphones. The microphones can either be housed within the telephone set at an appropriate location, or configured as an array of microphones. The idea of integrating an array of microphones in a telephone set is not new. U.S. Pat. No. 4,311,874 (Wallace) sets forth an array of microphones to capture sound for a telephonic conversation. Commonly available conference units typically have three directional microphones to pick up the sound in the room. For example, the 35XX series of telephone sets manufactured by Mitel Networks Corporation uses a microphone array housed in a special unit to capture the sound.

Stand alone microphones are also available from manufacturers such as Andrea and GN Netcom for use primarily with personal computers.

It will be apparent from the foregoing that currently available microphone arrays are sold either as separate products that do not necessarily integrate well with a telephone or are built into the telephone thus burdening the user with a feature that he/she may or may not want.

SUMMARY OF THE INVENTION

According to the present invention there is provided a universal microphone array stand that can be used with a large variety of telephones (including sets manufactured by different vendors) to provide the directionality advantages of a microphone array such as superior sound pick up. Some of the advantages of the microphone array stand of the present invention include improving signal transmission in noisy environments, improved speech recognition, and teleconferencing applications, among others.

The stand obviates the prior art requirement of incorporating a microphone array into each telephone. Instead, the stand may be sold separately and adapted to any telephone via a module, and may be upgraded with optimal weighting coefficients for beam forming, depending on the shape of the telephone.

BRIEF DESCRIPTION OF THE DRAWINGS

Embodiments of the present invention will now be described more fully with reference to the accompanying drawings in which:

FIG. 4 shows a series of beam patterns for the telephone set of FIG. 2, using optimised coefficients;

FIG. 5 shows a series of beam patterns for telephone set of FIG. 3, using optimised coefficients.

DETAILED DESCRIPTION OF THE PREFERRED EMBODIMENTS

Figure 1:
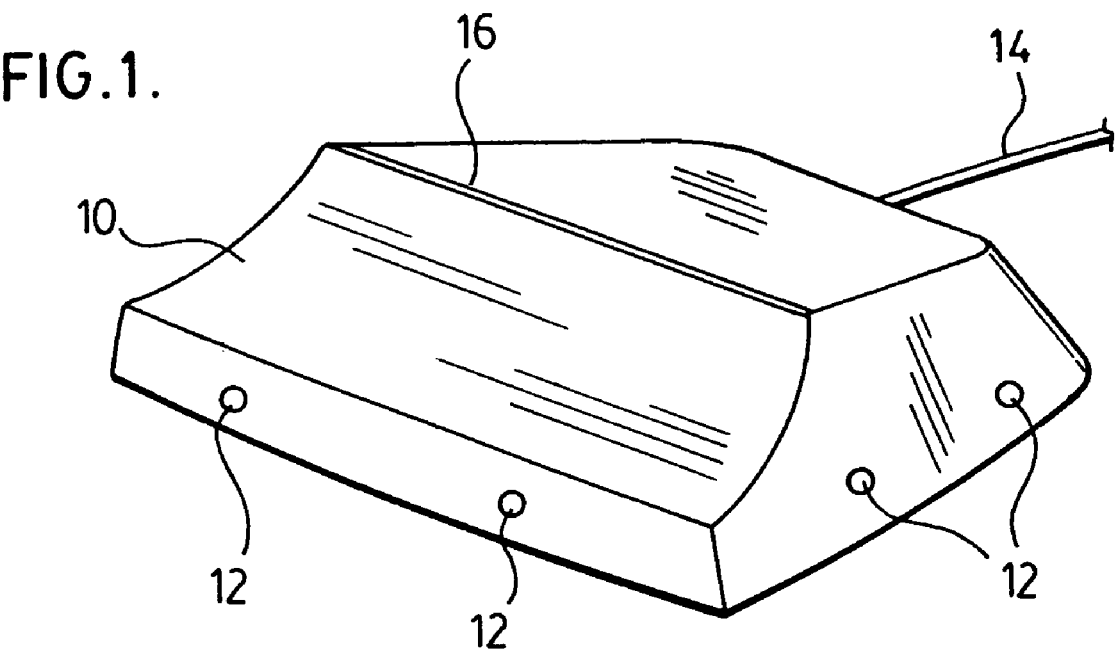
FIG. 1 shows a telephone stand incorporating an array of microphones, according to the preferred embodiment.

FIG. 1 shows a universal microphone array stand 10 according to the invention, for mechanical connection to a large variety of telephone sets, such as the sets depicted in FIGS. 2 and 3, discussed in greater detail below. The stand 10 incorporates a plurality of microphones 12 for receiving sound signals, which are transmitted to the telephone set (FIGS. 2 and 3) via a cable or wire 14. The cable 14 may vary in construction depending on the number of microphones used, the powering scheme employed and whether signal processing occurs within the stand or outside of the stand (e.g. within the telephone set or a module that connects to the set).

The stand has a solid enclosure that causes sound to be diffracted there around. In order to exploit the diffractive aspect of the stand 10 for obtaining good directional performance, it is advantageous to seal the stand to the bottom of the telephone set using, for example, a flexible member 16.

The exact shape and construction of the stand depends on industrial design as well as mechanical design of the sets to be accommodated. Two possible implementations are discussed below, wherein the first incorporates signal processing within the stand and the second does not.

In the first implementation the microphone signals are processed by a beamformer incorporated within the stand. An output signal of the beamformer is provided via cable 14 at microphone level, for input to the telephone set via a connector such as disclosed in U.S. Pat. No. 6,411,711 (Gancarcik) or via a handset or headset port such as commonly found on business telephone sets. In this implementation, compromise weighting coefficients must be calculated for the beamformer using acoustical numerical models of all the possible telephone set shapes, as set forth in GB Patent Application Nos. 0229267.0 and 0229059.1 (Dedieu and Moquin).

Figure 2:
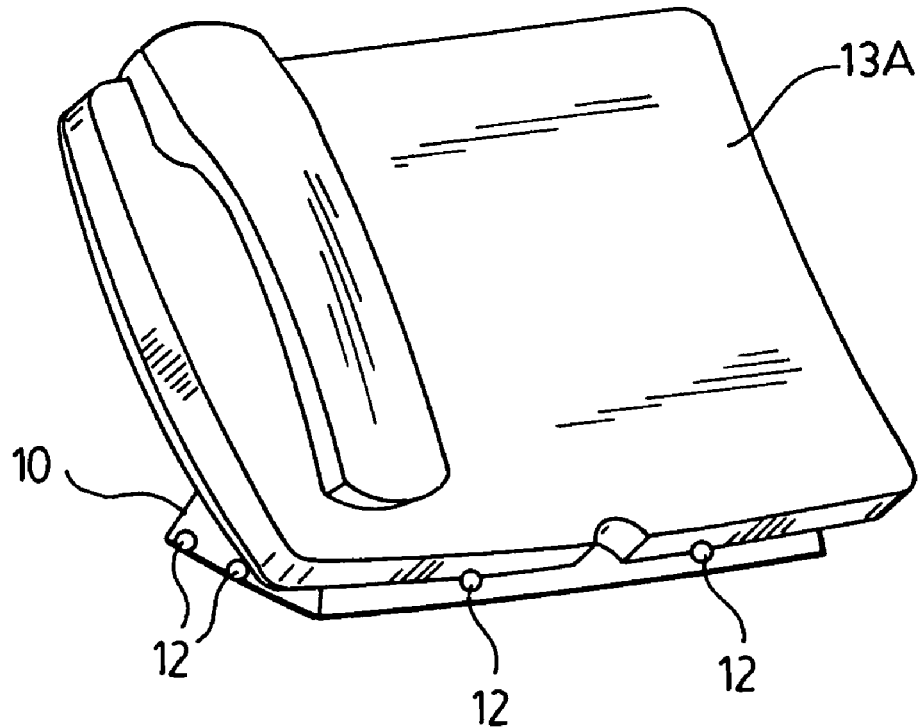
FIG. 2 shows the telephone stand of FIG. 1 with a telephone set connected thereto and supported thereby.
Figure 3:
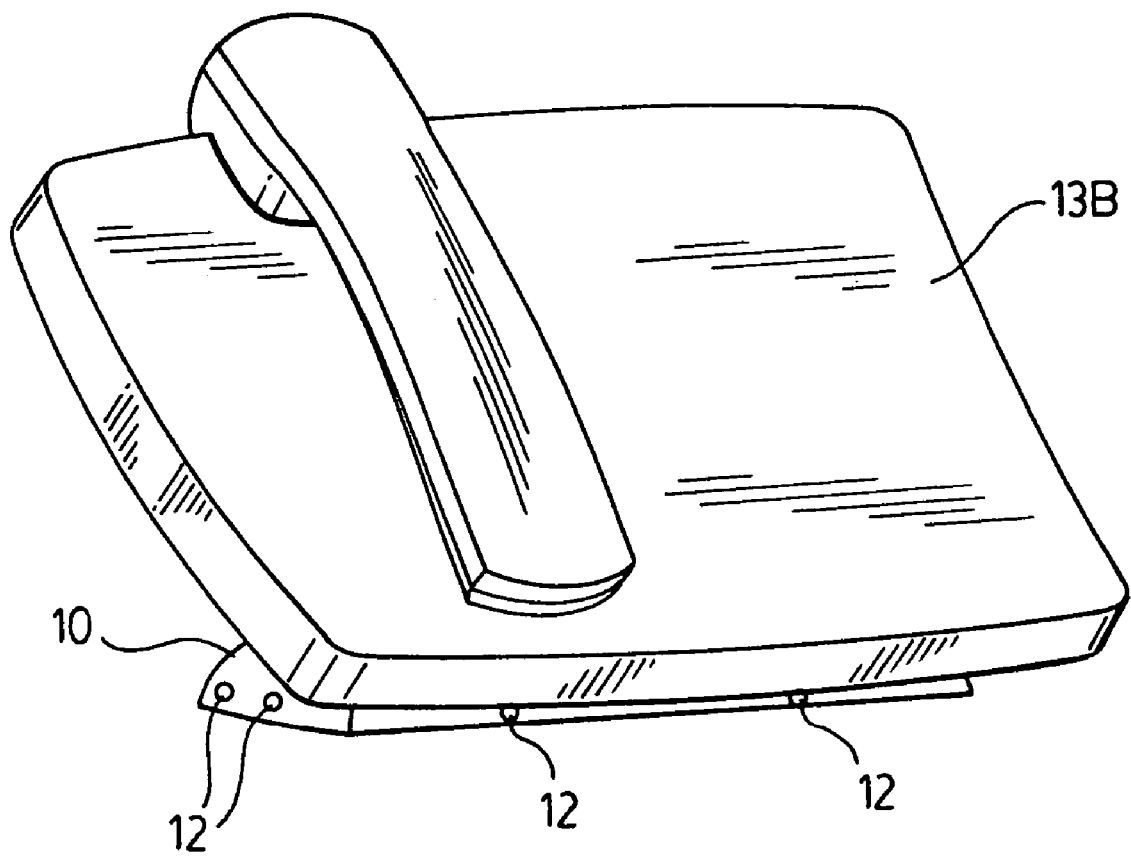
FIG. 3 shows the telephone stand of FIG. 1 with a telephone set of different design than as shown in FIG. 1 connected thereto and supported thereby.

For illustrative purposes, two sets 13A and 13B of quite different shape are depicted in FIGS. 2 and 3. The stand 10 is the same, but each set body is of significantly different shape and size.

Figure 6:
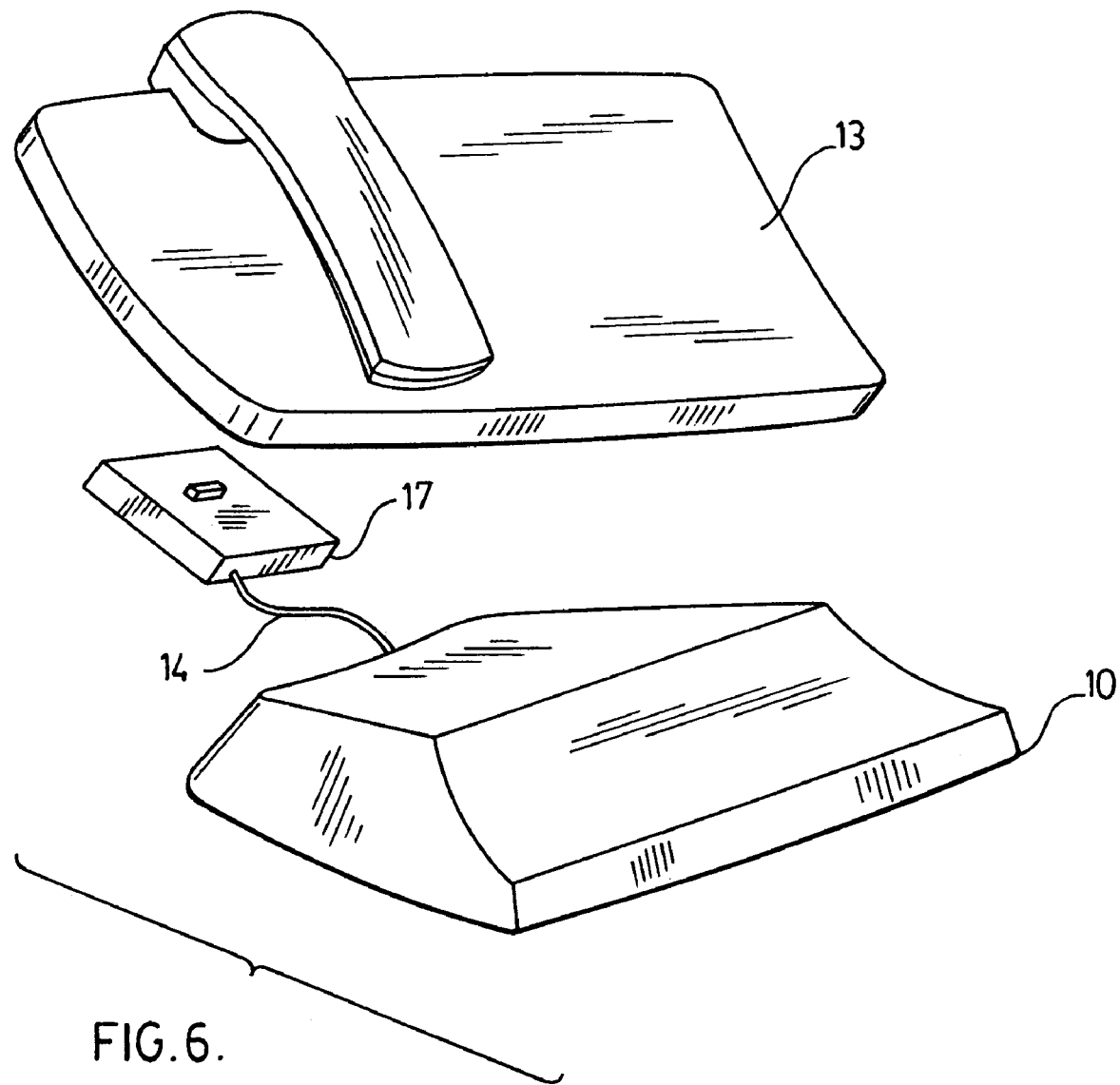
FIG. 6 shows an exploded view of the telephone stand with a module and a set.

Many business telephone sets have expansion or module connections that provide access to the internal circuitry of the telephone. These can be used to connect auxiliary equipment such as analogue lines, full-duplex speakerphone modules, etc. According to the second implementation of the invention, a module is provided for receiving identification information from the set and performing beamforming with optimized weighting coefficients based on the shape of telephone set, as shown in FIG. 6. The set 10 has a module 17 that connects to the rear of the set. A cable 14 connected to the stand 10 that houses the microphones. Once assembled, the set exteriorly looks very similar to FIGS. 2 and 3. The use of the module 17 also simplifies the provision of electrical power to the microphone array 12. Telephone sets typically generate identification information that is used by the system (e.g. PBX) to determine the set capabilities and functionality. This information is conveyed to the module in response to which the beamformer is adjusted to accommodate the specific set being used. In particular, the beamformer utilizes the weighting coefficients that are specific to the particular telephone shape. The resulting beampatterns for the sets depicted in FIGS. 2 and 3 are illustrated in FIGS. 6 and 7, from which it will be noted that there is good uniformity over the frequency band of interest as well as high directivity.

A person understanding the present invention may conceive of other embodiments and variations therein. For example, whereas the second implementation discussed above sets forth a module containing the beamformer, it is contemplated that the beamformer may be incorporated directly with in the telephone set. Also, whereas FIG. 1 shows a cable 14 for transmitting microphone signals to the telephone set (13A or 13B), it is contemplated that other signal conveyance means may be used to transmit the microphone signals (pre or post-beamformer). For example, the signals may be transmitted wirelessly (e.g., RF or IrDA), or via a connector in the supporting surface of the enclosure for direct connection between the stand 10 and the telephone set. Other variations and embodiments are possible within the sphere and scope of the invention, as defined by the claims appended hereto.

What is claimed is:

1. A stand for use with a variety of telephone sets, comprising:
    an enclosure having a surface for supporting any one of said variety of telephone sets;
    an array of microphones in said enclosure for detecting acoustic signals in the vicinity of and diffracted by said stand and said supported telephone set;
    a flexible member for sealing a bottom surface of said supported telephone set to said surface of said enclosure to maintain acoustic diffraction of said stand and said telephone set; and
    signal conveyance means for transmitting output signals representative of said acoustic signals from said stand to said one of said variety of telephone sets, wherein said stand can be separated from said telephone set to be used in another one of said variety of telephone sets.

2. The stand of claim 1, further comprising a beamformer within said enclosure for processing said output signals using weighting coefficients that have been optimized for acoustic diffraction effect of said one of said variety of telephone sets.

3. The stand of claim 1, further comprising a module having an internal beamformer connected to said array of microphones via said signal conveyance means, for receiving identification information from said one of said variety of telephone sets and in response processing said output signals using weighting coefficients that have been optimized according to said identification information for said one of said variety of telephone sets.

4. The stand according to claim 1, wherein said signal conveyance means is a cable.

5. The stand according to claim 2, wherein said signal conveyance means is a cable.

6. The stand according to claim 3, wherein said signal conveyance means is a cable.

7. The stand according to claim 1, wherein said signal conveyance means is a wireless transmitter.

8. The stand according to claim 2, wherein said signal conveyance means is a wireless transmitter.

9. The stand according to claim 3, wherein said signal conveyance means is a wireless transmitter.

10. The stand according to claim 7, wherein said wireless transmitter is a radio frequency (RF) transmitter.

11. The stand according to claim 7, wherein said wireless transmitter is an infrared (IrDA) transmitter.

* * * * *